Patented Dec. 8, 1931

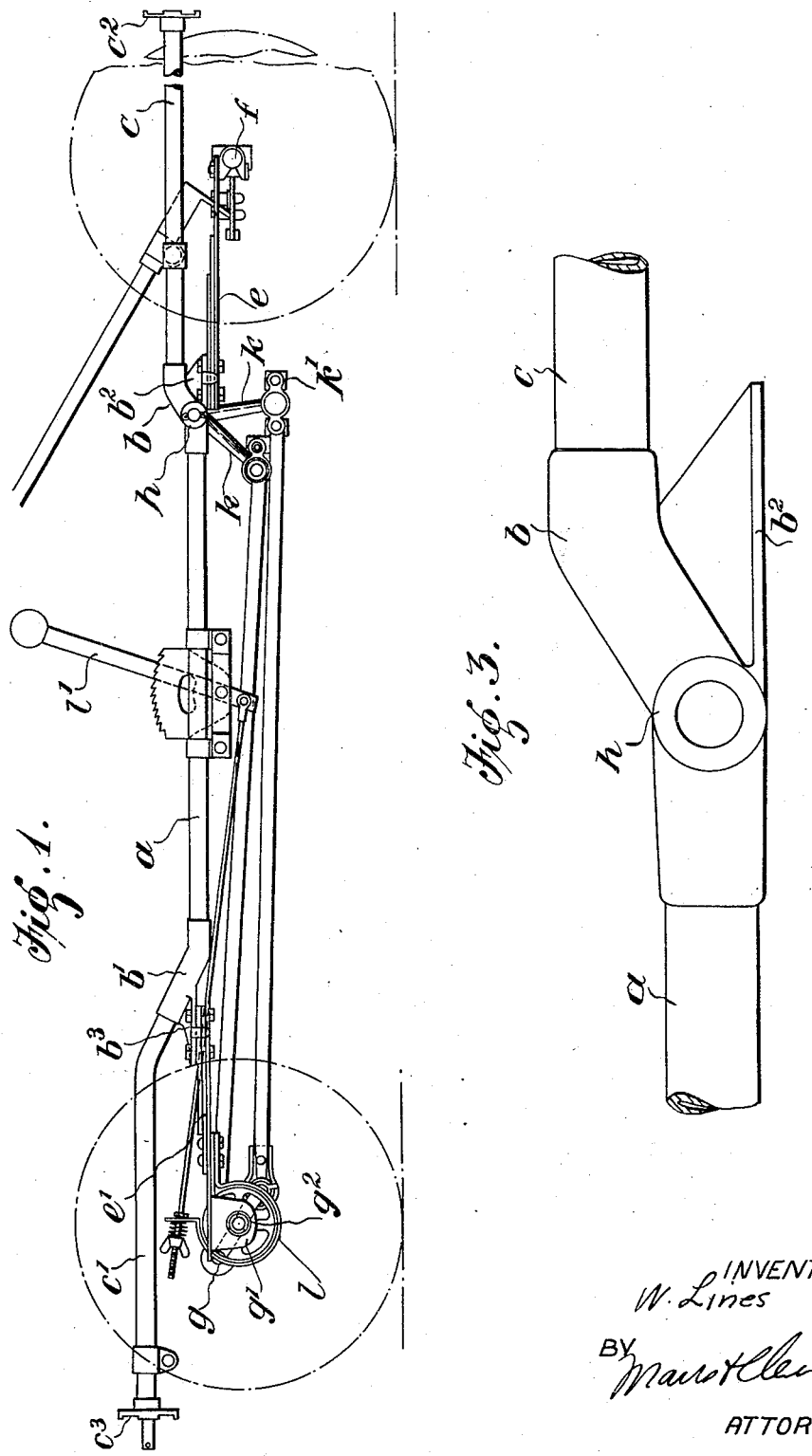

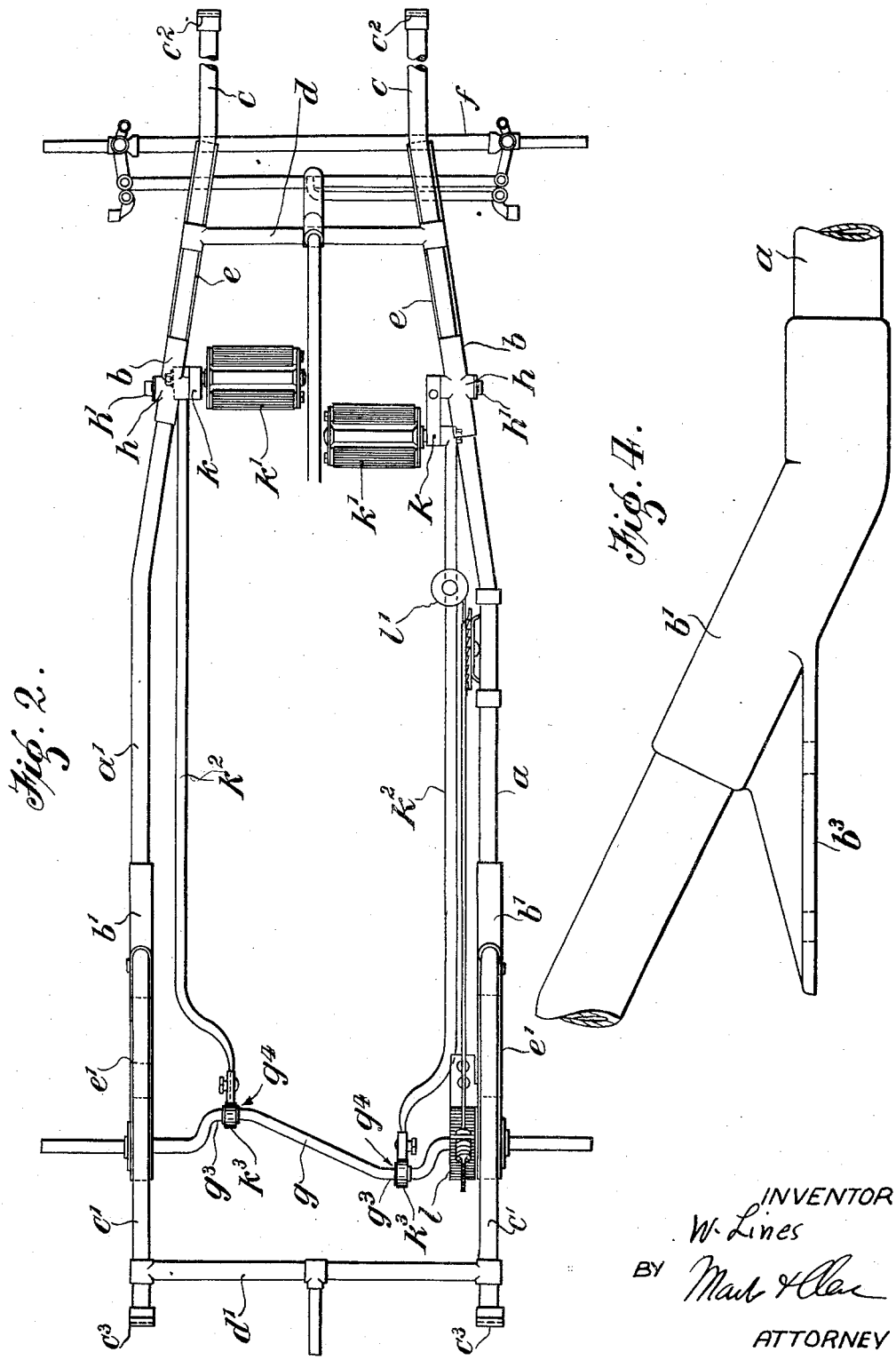

1,835,229

UNITED STATES PATENT OFFICE

WALTER LINES, OF MORDEN, LONDON, ENGLAND

PEDAL-PROPELLED ROAD VEHICLE

Application filed February 13, 1930, Serial No. 428,209, and in Great Britain February 15, 1929.

This invention has reference to pedal-propelled road vehicles and comprises certain improvements, as hereinafter described, which are particularly applicable to the chassis of vehicles such as are intended to be mounted with imitation or miniature motor-car bodies and/or with seating accommodation for a juvenile driver who propels the vehicle by working pedals which, through a suitable transmission gear, drive a back axle to which the rear road-wheels are connected.

According to the said invention the main frame of the chassis consists of a pair of main side-members, each of which is connected by lugs or junction-pieces to extension members, which extensions are located above quarter-elliptic springs from which the road-wheel axles are suspended, and whose shanks are secured to the frame by brackets that preferably are embodied in the lugs or junctions connecting the main frame members with the extension members.

The front pair of spring-brackets also carry bearings for accommodating the spindles of a pair of pedal-cranks pertaining to the rear axle drive, whilst the bearings for the said rear axle are carried in housings secured to the free ends of the rear pair of laminated springs. The rear axle may be cranked and the drive connections between the pedal cranks and the rear axle cranks may consist of connecting-rods having roller or other anti-friction bearings interposed between their rear ends and the crank-pins of the pedal-driven axle.

Since the invention is mainly applicable to a four-wheeled vehicle having a motor-car type of steering gear and a connecting-rod and crank-type transmission from the pedal-cranks to a cranked back axle, the various improvements constituting the same are hereinafter described in their application to such a vehicle, although it is to be understood that certain of the said improvements may be applied, wholly or in part, to three-wheel vehicles and/or to vehicles in which the transmission from the operating pedal-cranks to a live back-axle is of the chain-and-sprocket type.

A chassis constructed according to the present invention, and adapted for carrying a pedal and connecting-rod back-axle drive, is shown in the accompanying drawings wherein Figure 1 is an elevation, and
Figure 2 is a plan of the chassis.
Figure 3 is an enlarged elevation of one of the front pair of connecting lugs, and
Figure 4 is a similar view of one of the rear pair of connecting lugs.

The same letters of reference indicate corresponding parts in the several figures of the drawings.

In the construction illustrated, the chassis-frame comprises a pair of substantially parallel main side-members $a\ a^1$ on which the body or seating accommodation of the vehicle is mounted, and the two ends of each of these main members are each connected, by lugs or junction pieces $b\ b^1$ to extension members $c\ c^1$ which are up-swept or elevated in relation to the said main members, the up-swept extensions at the front and rear of the frame being tied together by cross-members $d\ d^1$ to produce a substantially rectangular frame. The up-swept extensions may, if desired, be continued beyond the front and rear cross-members to form brackets $c^2\ c^3$ on which imitation or miniature car-type "bumpers" or other accessories may be mounted, whilst the rear up-swept members may be provided with lugs or other fittings to enable the mounting thereon of mud-guards for the rear road-wheels.

The lugs or junction pieces $b\ b^1$ above referred to not only serve to connect the main side-members to the up-swept front and rear extensions, but are also adapted to serve as anchorages for a system of quarter-elliptic suspension springs $e\ e^1$ which are carried in pairs below the up-swept frame members at both front and rear of the chassis. For this purpose, angle-sectioned brackets $b^2\ b^3$ are extended from each junction-piece, the brackets $b^2$ of the front junctions $b$ being extended forwardly, and those from the back junctions $b^1$ being extended rearwardly, under the frame-extensions, and the shanks of the springs are suitably bolted to their respective brackets. The forward extremities of the front pair of springs $e$ are attached directly to a front axle-member $f$, whilst the rearward extremities of the two rear springs are attached to housings $g^1$ for the main bearings $g^2$ of a live rear-axle $g$. Further, the junction-pieces $b$ to which the front springs $e$ are anchored are formed or provided with transverse bearings $h$ to accommodate the spindles $h^1$ of a pair of driving cranks $k$, which are suspended from the said spindles on the inner sides of their complementary junction pieces and carry the driving pedals $k^1$ in convenient relation to the driving seat that is mounted on the main frame-members to the rear of the pedal-cranks. One of the rear-springs $e^1$, preferably the right-hand one, may be furnished with a bracket that serves as an anchorage for a hand-brake $l$ which is arranged to act upon a drum fixed to the corresponding end of the axle, and may be operated by a hand-lever $l^1$ mounted on the main frame within convenient reach of the driver.

Each pedal crank is coupled, by a connecting rod $k^2$ to a crank-formation $g^3$ in the back-axle $g$ whose bearings are, as already stated, suspended from the rear springs, and whose axle-arms are extended outwardly beyond the said bearings and fitted with the driving road-wheels. This back-axle may be produced from a length of solid rod or tubing bent or fashioned to produce therein, a pair of crank formations to which the connecting rods from the pedal-cranks are respectively connected.

Ball or roller bearings are preferably interposed between the rear-ends of the connecting rods $k^2$ and the crank-pins or journal portions $g^3$ of the back-axle, and when the said axle is produced by fashioning or bending a length of rodding or tubing, the construction and assembly of the connecting-rods and their bearings may be simplified by fixing or locating the bearings $g^4$ in their prescribed positions on the axle, and assembling the connecting rods thereto, whilst the axle-rod or tube is in the straight; i. e., before the said rod or tube is bent or fashioned to produce the crank formations. This may be realized by passing or threading the bearing-units $g^4$ over the ends of the straight rod or tube to the parts of the said rod or tube which eventually constitute the journal-portion of the cranks and positively locating said units in such position by some method or means that confines them against lateral displacement, such for example, as by punching studs or stops out of the axle-metal at, and closely adjacent to, the opposite sides of each bearing. Then, the solid or unsplit sleeve ends $k^3$ of the connecting rods $k^2$ are likewise passed over the axle rod ends and assembled over their repective and previously-located bearing units, after which the fashioning or bending of the axle-rod into the desired double-crank formation is proceeded with. After the cranking of the rod, the main bearings $g^2$ may be applied and housed in the anchor-brackets $g^1$ by which the said main bearings are suspended from the rear-springs of the chassis, the assembling of the connecting-rods $k^2$ of the pedal cranks $k$ being performed either before or after the axle has been assembled to the rear-springs.

Having described my invention, what I claim and desire to secure by Letters Patent is:—

1. A chassis for a pedal propelled vehicle comprising a pair of substantially parallel side-members, two pairs of upswept or elevated end extension members, lugs for connecting one of the extension members to each end of each of said side members, and means for connecting axle suspension springs to said lugs.

2. A chassis for a pedal propelled vehicle comprising a pair of substantially parallel side-members, two pairs of upswept or elevated end extension members, lugs for connecting one of the extension members to each end of each of said side members, extensions on said lugs and means for connecting axle suspension springs to said extensions.

3. A chassis for a pedal propelled vehicle comprising a main frame consisting of a pair of substantially parallel side-members, each end of which is connected to an upswept or elevated extension member by a junction that serves also as an anchorage for an axle suspension spring, the pair of junction pieces to which the front springs are secured having bearings to accommodate the spindles of a pair of pedal cranks.

4. A chassis for a pedal propelled vehicle comprising a main frame consisting of a pair of substantially parallel side-members, an upswept or elevated extension member at each end of said side-members, means for connecting said extensions to said side-members, axle suspension springs and means formed on said means for connecting the side and extension members whereby said springs may be anchored thereto, wherein the means for connecting the front extensions to the side frame members are formed with bearings adapted to accomodate the spindles of the pedal cranks.

5. A chassis for a pedal propelled vehicle as claimed in claim 3 wherein the pedal cranks are suspended from their respective spindles on the inner sides of their complementary junction pieces and transmission rods connect the pedal cranks to a crank rear axle.

6. A chassis for a pedal propelled vehicle comprising a main frame consisting of a pair of side-members, an upswept or elevated extension member at each end of said side-members, junction pieces for connecting said extensions to said side-members, axle suspension springs, means formed on said junction pieces whereby said spring may be anchored thereto, pedal cranks, bearings in the front pair of junction pieces adapted to accommodate the spindles of said pedal cranks, a crank rear axle and transmission rods connecting the latter and said pedal cranks.

7. A chassis as claimed in claim 6 wherein the crank rear axle is produced by bending or shaping a length of rod or tube and bearings for the transmission connecting rods are applied to and located upon the rear axle prior to the crank bending operation.

8. A chassis as claimed in claim 6 wherein bearings are assembled and located on an axle rod or tube and the drive transmitting connecting rods are assembled over the bearings prior to the said rod or tube being fashioned or shaped to produce the crank formations.

9. A chassis for a pedal-propelled vehicle comprising a pair of substantially parallel side members, a pair of upswept or elevated extension members located adjacent the forward end of said side members, a further pair of upswept or elevated extension members located adjacent the rear end of said side members, lugs for connecting the said upswept or elevated members to the said side members, means for connecting said lugs to axle suspension springs and bearings in the lugs at the forward end of the said side members for carrying the spindles of the pedal cranks.

In witness whereof I affix my signature.

WALTER LINES.